United States Patent
Teufel et al.

(10) Patent No.: US 7,559,332 B2
(45) Date of Patent: Jul. 14, 2009

(54) MEDIA REMOVAL APPARATUS AND METHODS OF REMOVING MEDIA

(75) Inventors: Paul Teufel, Los Alamitos, CA (US); Curtis Longo, Alta Loma, CA (US)

(73) Assignee: Toyota Motor Sales U.S.A., Inc., Torrance, CA (US)

(*) Notice: Subject to any disclaimer, the term of this patent is extended or adjusted under 35 U.S.C. 154(b) by 417 days.

(21) Appl. No.: 10/609,592

(22) Filed: Jul. 1, 2003

(65) Prior Publication Data

US 2004/0103918 A1 Jun. 3, 2004

Related U.S. Application Data

(60) Provisional application No. 60/392,980, filed on Jul. 2, 2002.

(51) Int. Cl.
  *B08B 5/04* (2006.01)
(52) U.S. Cl. .................. 134/22.12; 134/22.18; 15/383; 15/104.9
(58) Field of Classification Search .......... 134/8, 134/21, 22.1, 184, 198; 15/300.1, 304, 318, 15/363, 383, 104.03, 104.04; 264/139
  See application file for complete search history.

(56) References Cited

U.S. PATENT DOCUMENTS

| | | | | | |
|---|---|---|---|---|---|
| 1,475,989 | A | * | 12/1923 | Easterday | 15/104.095 |
| 1,869,730 | A | * | 8/1932 | Antle | 15/314 |
| 1,990,991 | A | * | 2/1935 | Heubach | 409/137 |
| 2,193,999 | A | * | 3/1940 | Allen | 15/367 |
| 2,499,693 | A | * | 3/1950 | Stanton | 56/32 |
| 2,517,902 | A | | 8/1950 | Luebkeman | |
| 2,870,993 | A | * | 1/1959 | Jahnke | 175/209 |
| 2,905,506 | A | * | 9/1959 | Kristensen | 406/56 |
| 3,136,583 | A | * | 6/1964 | Griffin, III | 37/326 |
| 3,690,731 | A | * | 9/1972 | Mylting | 406/30 |
| 3,718,220 | A | * | 2/1973 | Titus | 414/314 |
| 3,757,375 | A | * | 9/1973 | Strom | 15/104.33 |
| 3,775,805 | A | * | 12/1973 | Mitchell et al. | 15/304 |
| 3,897,604 | A | * | 8/1975 | Weimer | 15/344 |

(Continued)

FOREIGN PATENT DOCUMENTS

CH 632 444 * 10/1982

(Continued)

OTHER PUBLICATIONS

John Berry, International Search Report for International Application No. PCT/US01/43091 (Jul. 17, 2002).

(Continued)

*Primary Examiner*—Frankie L Stinson
(74) *Attorney, Agent, or Firm*—Finnegan, Henderson, Farabow, Garrett & Dunner LLP

(57) ABSTRACT

The present invention relates to apparatus and methods of removing media. In particular, the present invention relates to apparatus and methods of removing media from a tooling for a fuselage. In one implementation, the media removal apparatus uses an auger to dislodge the media, and a vacuum to remove the media. In another implementation the media removal apparatus uses an air pressure line to dislodge the media and a vacuum to remove the media.

8 Claims, 19 Drawing Sheets

U.S. PATENT DOCUMENTS

| | | | |
|---|---|---|---|
| 4,037,982 A * | 7/1977 | Clement | 408/61 |
| 4,124,956 A * | 11/1978 | Levinson | 451/456 |
| 4,245,437 A * | 1/1981 | Marton | 451/456 |
| 4,312,762 A * | 1/1982 | Blackburn et al. | 210/768 |
| 4,546,519 A * | 10/1985 | Pembroke | 15/395 |
| 4,666,530 A * | 5/1987 | Houser | 134/22.1 |
| 4,751,759 A * | 6/1988 | Zoell | 15/1.51 |
| 4,783,232 A | 11/1988 | Carbone et al. | |
| 4,792,363 A * | 12/1988 | Franklin et al. | 134/8 |
| 4,822,444 A | 4/1989 | Weingart et al. | |
| 4,869,761 A | 9/1989 | Weingart et al. | |
| 4,907,754 A | 3/1990 | Vaniglia | |
| 4,938,824 A | 7/1990 | Youngkeit | |
| 5,013,514 A * | 5/1991 | Azzani et al. | 264/512 |
| 5,021,095 A * | 6/1991 | Tamaki | 134/21 |
| 5,022,952 A | 6/1991 | Vaniglia | |
| 5,057,174 A * | 10/1991 | Anderson et al. | 156/155 |
| 5,059,377 A | 10/1991 | Ashton et al. | |
| 5,107,568 A * | 4/1992 | Wade | 15/387 |
| 5,129,467 A * | 7/1992 | Watanabe et al. | 173/75 |
| 5,145,297 A * | 9/1992 | McGrath, Jr. | 409/132 |
| 5,184,372 A * | 2/1993 | Mache | 15/401 |
| 5,223,067 A | 6/1993 | Hamamoto et al. | |
| 5,242,523 A | 9/1993 | Willden et al. | |
| 5,259,901 A | 11/1993 | Davis et al. | |
| 5,262,121 A | 11/1993 | Goodno | |
| 5,266,137 A | 11/1993 | Hollingsworth | |
| 5,318,576 A * | 6/1994 | Plassche et al. | 606/159 |
| 5,362,345 A | 11/1994 | Stettler et al. | |
| 5,378,109 A | 1/1995 | Lallo et al. | |
| 5,428,861 A * | 7/1995 | Heard et al. | 15/304 |
| 5,447,765 A | 9/1995 | Crane | |
| 5,571,357 A | 11/1996 | Darrieux et al. | |
| 5,768,741 A * | 6/1998 | Leiman et al. | 15/304 |
| 5,795,216 A * | 8/1998 | Graves | 451/456 |
| 5,802,667 A * | 9/1998 | Williams | 15/395 |
| 5,925,297 A | 7/1999 | Noto | |
| 6,086,524 A | 7/2000 | Martin | |
| 6,096,164 A | 8/2000 | Benson et al. | |
| 6,146,066 A * | 11/2000 | Yelton | 409/134 |
| 6,179,945 B1 | 1/2001 | Greenwood et al. | |
| 6,190,598 B1 | 2/2001 | Murphy et al. | |
| 6,482,215 B1 * | 11/2002 | Shiber | 606/159 |
| 6,692,681 B1 * | 2/2004 | Lunde | 264/510 |
| 2002/0056788 A1 | 5/2002 | Anderson et al. | |
| 2002/0069962 A1 | 6/2002 | Maxwell et al. | |
| 2003/0052212 A1 | 3/2003 | Anderson et al. | |
| 2005/0002269 A1 * | 1/2005 | Longo | 366/108 |

FOREIGN PATENT DOCUMENTS

| | | | |
|---|---|---|---|
| DE | 34 21 367 | * | 12/1985 |
| EP | 0 770 472 A1 | | 5/1997 |
| EP | 0 786 330 A2 | | 7/1997 |
| EP | 1 005 978 A2 | | 6/2000 |
| FR | 2 424 470 | | 11/1979 |
| FR | 2 664 529 | | 1/1992 |
| GB | 1 481 167 | | 7/1977 |
| GB | 2 232 954 A | | 1/1991 |
| JP | 55-21322 | * | 2/1980 |
| JP | 63-264240 | * | 11/1988 |
| JP | 0 4179515 | | 6/1992 |
| JP | 8-39187 | * | 2/1996 |
| JP | 10-102533 | * | 4/1998 |
| JP | 2001-47191 | * | 2/2001 |
| SU | 404444 | * | 5/1974 |
| SU | 619657 | * | 7/1976 |
| WO | WO 98/32589 | | 7/1998 |

OTHER PUBLICATIONS

J. Carre, International Search Report for International Application No. PCT/US02/05094 (Aug. 2, 2002).

D.V. Rosato et al., "Filament Winding: Its Development, Manufacture, Applications, and Design," John Wiley & Sons, Inc., (1964).

A. Van Wallene, International Search Report for International Application No. PCT/US01/45750 (Sep. 19, 2002).

McMaster-Carr Supply Company Catalog 105, p. 1581 (1999).

* cited by examiner

MEDIA REMOVAL APPARATUS AND METHODS OF REMOVING MEDIA

CROSS-REFERENCE TO RELATED APPLICATION

This application claims the benefit of U.S. Provisional Application No. 60/392,980, filed Jul. 2, 2002, by Paul Teufel and Curtis Longo and titled MEDIA REMOVAL APPARATUS AND METHODS OF REMOVING MEDIA, the disclosure of which is expressly incorporated herein by reference.

BACKGROUND OF THE INVENTION

A. Field of the Invention

The present invention relates to apparatus and methods of removing media. In particular, the present invention relates to apparatus and methods of removing media from tooling for a fuselage.

B. Background of the Invention

Presently, composite materials (such as fiber reinforced plastics) are increasingly being used to manufacture aircraft. The manufacture of such aircraft includes the manufacture of the fuselage (the central body of the aircraft), the internal frames of the fuselage, and the various other components of the aircraft. Often the manufacture of the internal frames of an aircraft fuselage with composites includes the use of tooling to form the shape of the internal frames. For example, in some manufacturing processes, laminate fibers are wrapped around tooling to form the shape of the internal frames.

In certain applications, this tooling is constructed of elastomeric materials. The use of elastomeric materials provides for increased flexibility in the formation of the shape of the tooling. However, hollow elastomeric tooling does not provide the rigidity needed during the lay up and curing process. Therefore, the elastomeric tooling can be filled with a media and held under vacuum to provide the necessary rigidity. After curing of the fuselage, the media is removed from the tooling, and the tooling is removed from the fuselage.

The compaction of the media, however, often prevents the media from being completely extracted. Currently, gravity and vibration sources are used to dislodge the media from the tooling. The vibration source causes the compacted media to dislodge into smaller pieces, which can be more easily extracted. This process often needs to be performed several times to completely remove all of the media. Further, vibration of the tooling may not be sufficient to fully dislodge the media. Thus, removal of the media from a tooling may become a time consuming process. This increases the labor costs to produce the part.

Media removal apparatus and methods for removing media from internal tooling for a fuselage could therefore provide many advantages. The apparatus and methods may allow for improved extraction of the media, increased extraction efficiency, and/or decreased cost of manufacturing the internal frames for a fuselage.

As for improved extraction, the media removal apparatus may allow the compacted media to be dislodged more completely or in smaller, more removable pieces. This could increase the rate of media removal and thereby decrease the time needed for extraction.

Therefore, it is desirable to provide media removal apparatus and methods for quickly removing media from internal tooling for a fuselage.

SUMMARY OF THE INVENTION

Apparatus and methods consistent with the invention may provide for an apparatus for removing media from a mandrel. The apparatus includes a vacuum source and a vacuum assembly connected to the vacuum source. The vacuum source includes a vacuum hose and a media dislodgement device cooperating with the vacuum hose and capable of being inserted through an opening in the mandrel.

Apparatus and methods consistent with the invention may also provide for a method of removing media from a mandrel. The method includes inserting a vacuum assembly including a vacuum hose and a media dislodgement device into the mandrel; dislodging the media using the media dislodgement device; and extracting the media using the vacuum hose.

Additional aspects of the invention are disclosed and defined by the appended claims. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments consistent with the invention and, together with the following description, serve to explain the principles of the invention.

In the drawings.

DESCRIPTION OF THE EMBODIMENTS

A. Introduction

Apparatus and methods consistent with the present invention will now be described with respect to a media removal apparatus for removing media from internal tooling for a fuselage. The following examples are only representative of embodiments and implementations consistent with the invention. Other embodiments and other implementations may also be used.

B. Apparatus and Methods

Figure 1:
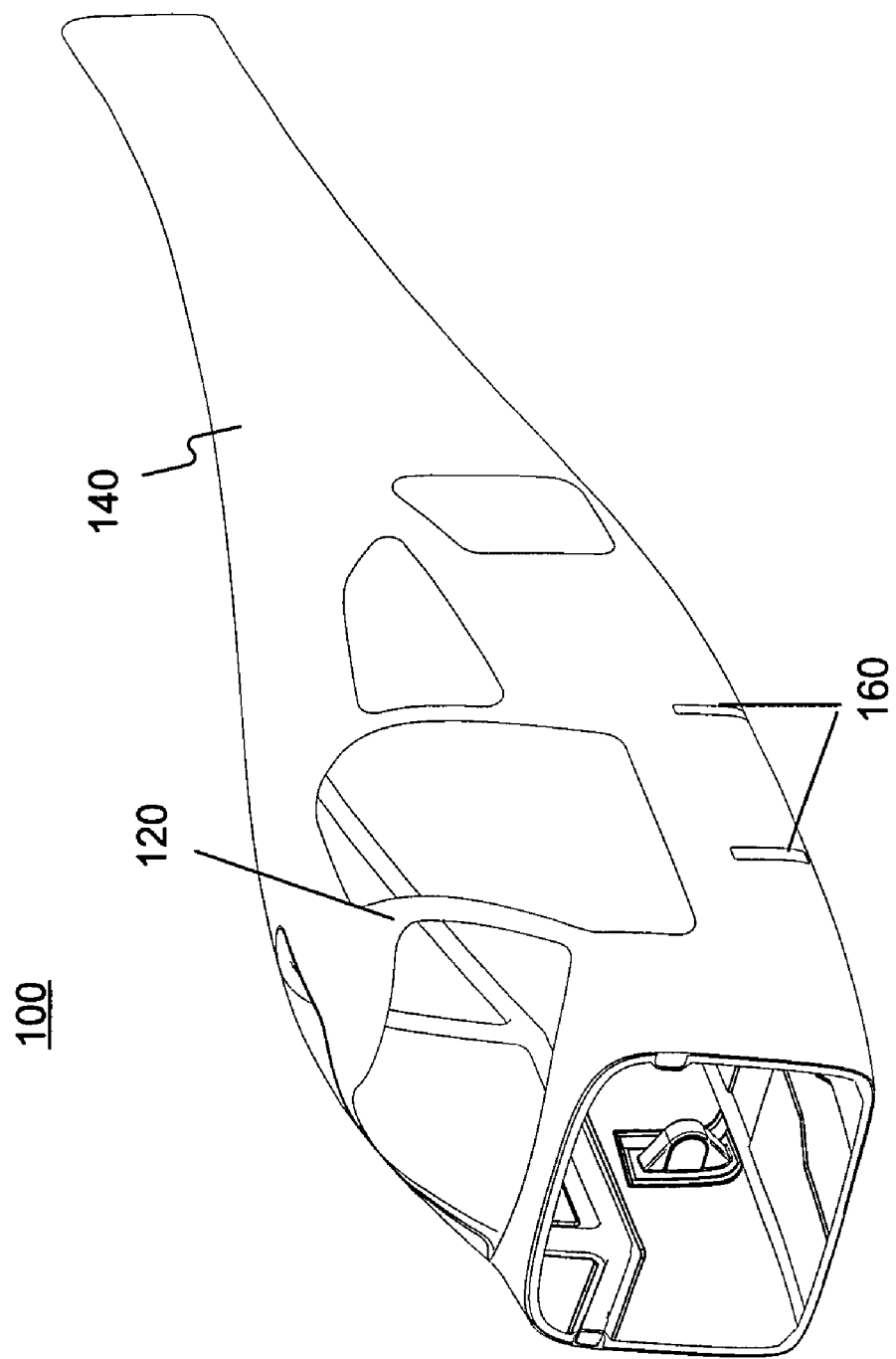
FIG. 1 is a perspective view of a fuselage for an aircraft.

FIG. 1 is a perspective view of a fuselage for an aircraft. As shown in FIG. 1, a fuselage 100 comprises a fuselage skin 140, frame sections 120, and attachment fittings 160 for wings. Fuselage 100 may also comprise other frame sections, attachments fittings, and flanges (not shown). Fuselage 100 may also comprise other components and subcomponents (not shown).

Figure 2:
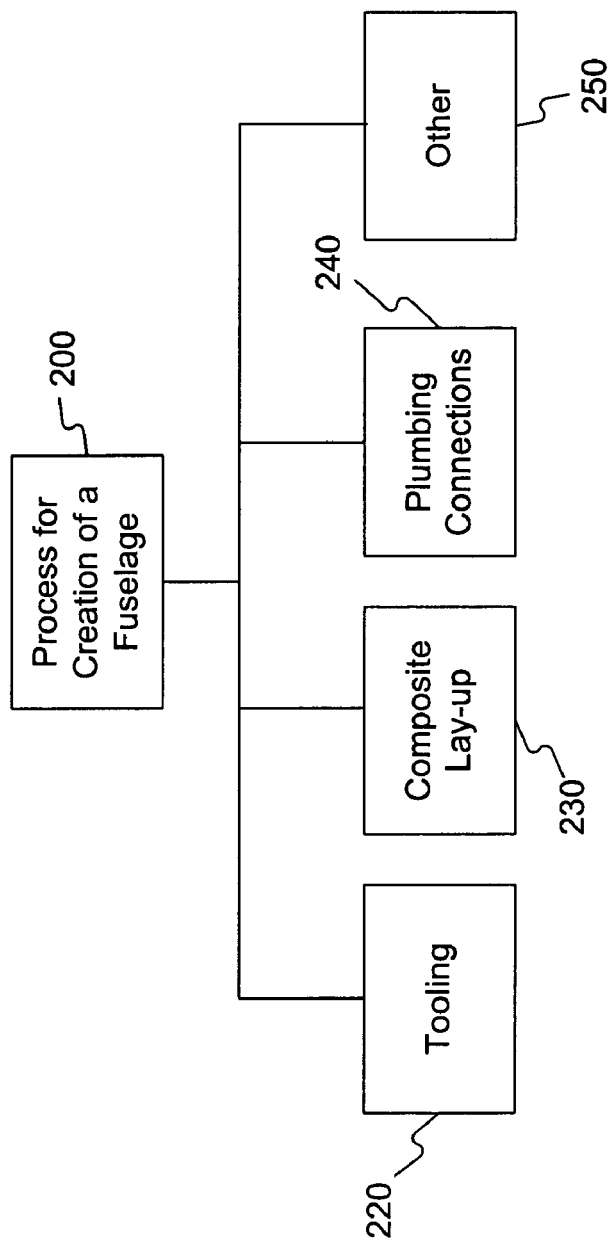
FIG. 2 is a block diagram illustrating a process for creating a fuselage, as shown in FIG. 1.

FIG. 2 is a block diagram illustrating a process for creating a fuselage, as shown in FIG. 1. As shown in FIG. 2, process for creation of a fuselage 200 includes tooling 220, composite lay-up 230, plumbing connections 240, and other 250. Tooling 220 includes any process utilizing tooling for manufacturing a fuselage. For example, tooling 220 may include the use of metal molds, molds made from composite materials, and/or mandrels made from metals and composite materials. Tooling 220 also includes the use of toolings made from elastomeric materials such as silicone, urethane, latex, or natural rubbers. Tooling 220 further includes the use of such things as plastic or metal dies and punches. Composite lay-up 230 includes the use of any composite material to form the skin of a fuselage. Composite lay-up 230 may include hand lay-up of composite plies, integration of tooling and lay-up, and filament winding, as well as other processes. Plumbing connections 240 includes the use of plumbing connections within the tooling to allow for the application of a vacuum or air pressure to portions of the tooling. Other 250 may include such processes as molding, integration of tooling and molding, and filament winding as well as any other process.

Figure 3:
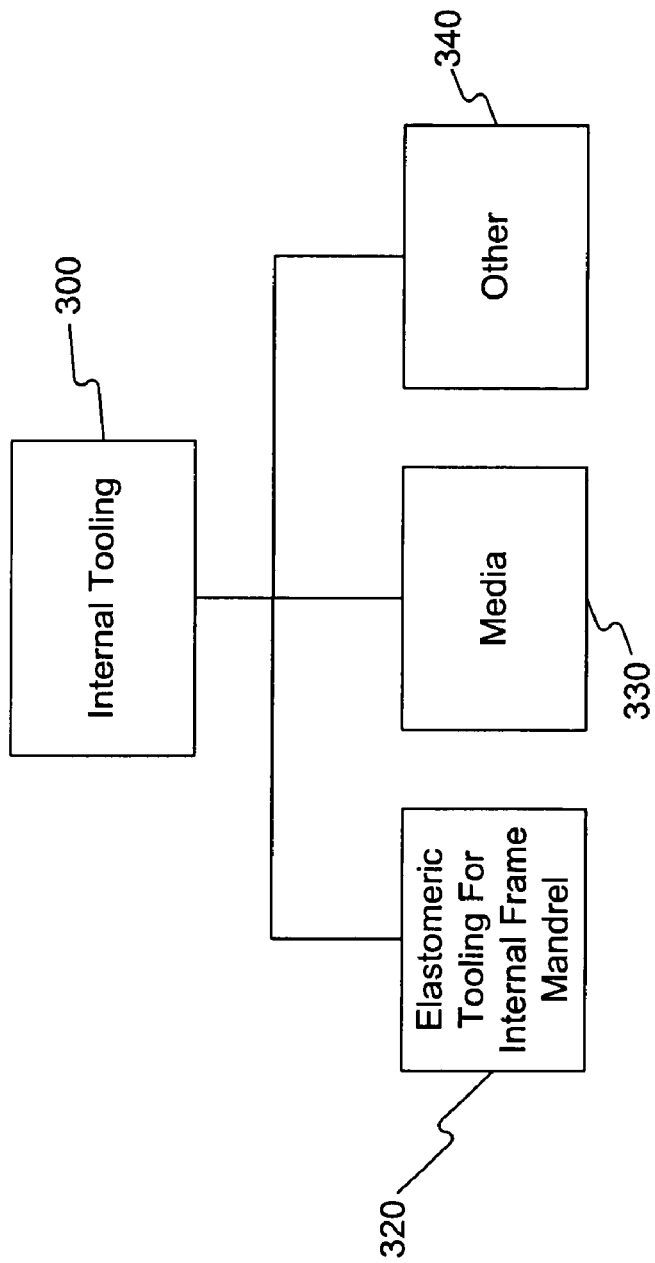
FIG. 3 is a block diagram illustrating the components of an internal tooling for manufacturing a fuselage consistent with an embodiment of the present invention, as shown in FIG. 2.

FIG. 3 is a block diagram illustrating the components of an internal tooling for manufacturing a fuselage consistent with an embodiment of the present invention, as shown in FIG. 2. As shown in FIG. 3, internal tooling 300 includes an elastomeric tooling for internal frame mandrel 320, media 330, and other 340. In this implementation, elastomeric tooling for internal frame mandrel 320 refers to the use of an elastomeric bladder that may be filled with media 330 to maintain the internal shape of a frame during construction of the fuselage. Media 330 includes any granular material that will rigidize elastomeric tooling for internal frame mandrel 320. In one implementation, media 330 comprises ceramic spheres available under the product name Macrolite. Other 340 may include any other portions of the tooling. This implementation is merely exemplary, and other implementations may also be used.

Figure 4:
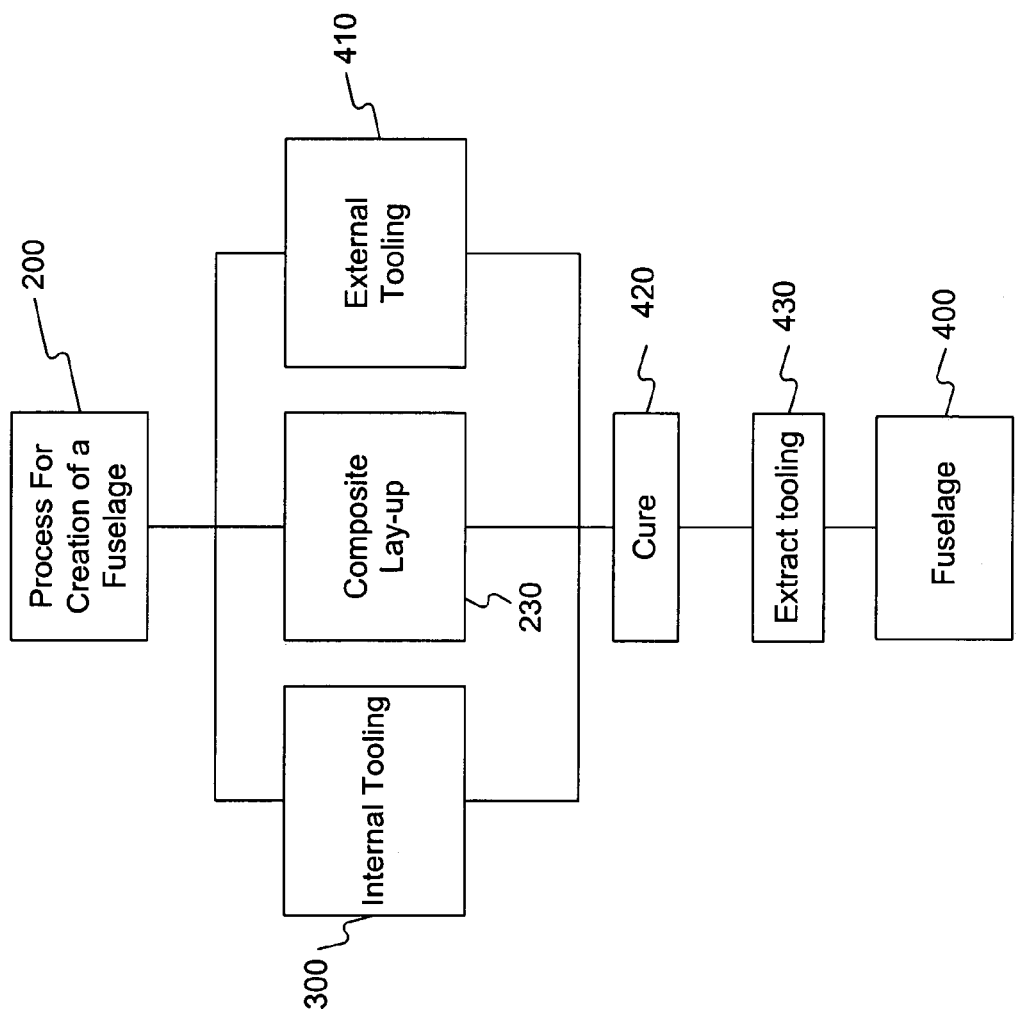
FIG. 4 is a flow diagram illustrating creating a fuselage consistent with an embodiment of the invention, as shown in FIG. 3.

FIG. 4 is a flow diagram illustrating creating a fuselage consistent with an embodiment of the invention, as shown in FIG. 3. As shown in FIG. 4, in one implementation, process for creation of a fuselage 200 comprises internal tooling 300, composite lay-up 230, external tooling 410, cure 420, and extract tooling 430. External tooling 410 includes any tooling used to shape the exterior of a fuselage. In one implementation, external tooling 410 includes a clamshell tooling. Cure 420 includes a any cure process to form the fuselage. Extract tooling 430 includes any process to remove the tooling from the external tooling 420. As shown in FIG. 4, in this implementation, the process for the creation of a fuselage 200 comprises the combination of internal tooling 300, composite lay-up 230, external tooling 410, cure 420, and extract tooling 430, which results in fuselage 300. This implementation is merely exemplary, and other implementations may also be used.

Figure 5:
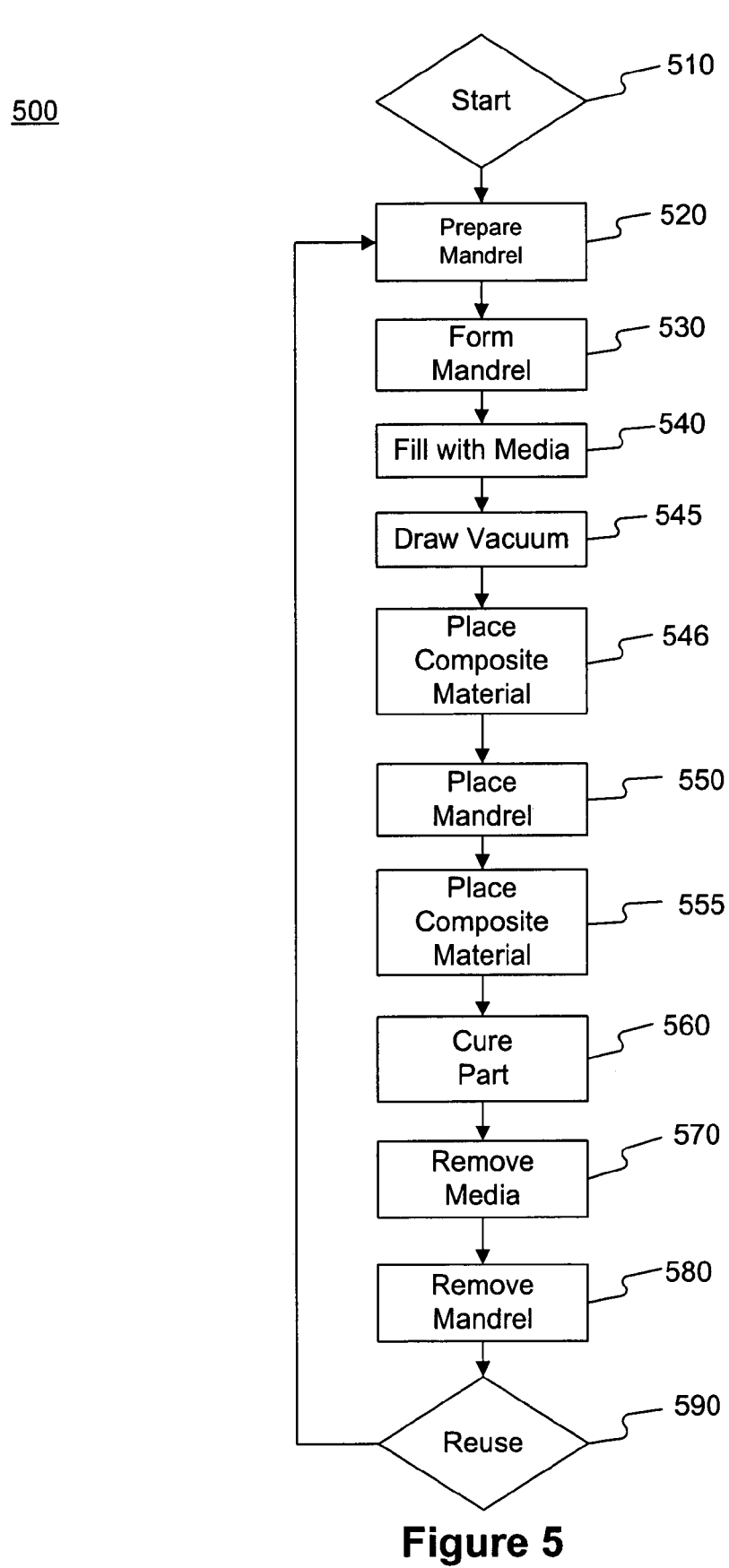
FIG. 5 is a flow diagram illustrating a process for creating an internal frame of a fuselage using a mandrel consistent with one embodiment of the present invention, as shown in FIG. 4.

FIG. 5 is a flow diagram illustrating a process for creating an internal frame of a fuselage using a mandrel consistent with one embodiment of the present invention, as shown in FIG. 4. As shown in FIG. 5, in one implementation, process 500 for creating an internal frame of a fuselage using a mandrel comprises start 510, prepare mandrel 520, form mandrel 530, fill with media 540, draw vacuum 545, place composite material 546, place mandrel 550, place composite material 555, cure part 560, remove media 570, remove mandrel 580, and reuse 590.

In this implementation, process 500 begins with start 510. After start 510 is prepare mandrel 520. In this implementation, prepare mandrel 520 comprises cleaning and applying any necessary release agents to assure the mandrel can be removed after part cure. In this implementation, material is formed to shape from pre-cured silicone material. Other materials, such as latex and nylon, may also be used. Prepare mandrel 520 is further described in relation to FIG. 6.

In this implementation, prepare mandrel 520 is followed by form mandrel 530. Form mandrel 530 comprises the forming of the mandrel to the desired shape of the internal frame. Vacuum or pressure may be used to hold the proper shape of the elastomeric bladder prior to filling. Form mandrel 530 is further described in relation to FIG. 7.

In this implementation, form mandrel 530 is followed by fill with media 540. Fill with media 540 comprises filling the mandrel with media. Fill with media 540 may also comprise compacting the media. Fill with media 540 is further described in relation to FIG. 8.

In this implementation, fill with media 540 is followed by draw vacuum 545. Draw vacuum 545 includes drawing a vacuum on the mandrel to rigidize the mandrel. Removing air and maintaining the media cavity under vacuum substantially rigidizes the cross-section of the frame shape.

In this implementation, draw vacuum 545 is followed by place composite material 546. Place composite material comprises the hand or machine lay-up of laminate plies (prepreg or similar) into the frame cavities in the fuselage mandrel. Place composite material 546 is further described in relation to FIG. 9.

In this implementation, place composite material 546 is followed by place mandrel 550. Place mandrel 550 comprises the placement of the frame mandrel onto a tooling for formation of the internal frame of the fuselage. Place mandrel 550 is further described in relation to FIG. 9.

In this implementation, place mandrel 550 is followed by place composite material 555. Place composite material 555 involves the hand or machine placement of laminate plies (prepreg or similar) around and on top of the frame mandrels. Place composite material 555 is further described in relation to FIG. 10.

In this implementation, place composite material is followed by cure part 560. Cure part 560 comprises the heating and pressurization of the composite materials to produce a structurally sound and lightweight fuselage. Cure part 560 is further illustrated in relation to FIG. 10.

In this implementation, cure part 560 is followed by remove media 570. Remove media 570 comprises the extraction of the media from the mandrel. Remove media 570 may also comprise dislodging any compacted media. Remove media 570 is further described in relation to FIGS. 11-15.

In this implementation, remove media 570 is followed by remove mandrel 580. Removal mandrel 580 comprises the removal of the mandrel from the fuselage. Remove mandrel 580 is further described in relation to FIG. 16.

In this implementation, remove mandrel 580 is followed by reuse 590. As shown in FIG. 5, after remove mandrel 580, reuse 590 indicates that the mandrel may be reused again.

The stages in FIG. 5 are merely exemplary, and other stages and other implementations may also be used.

Figure 6:
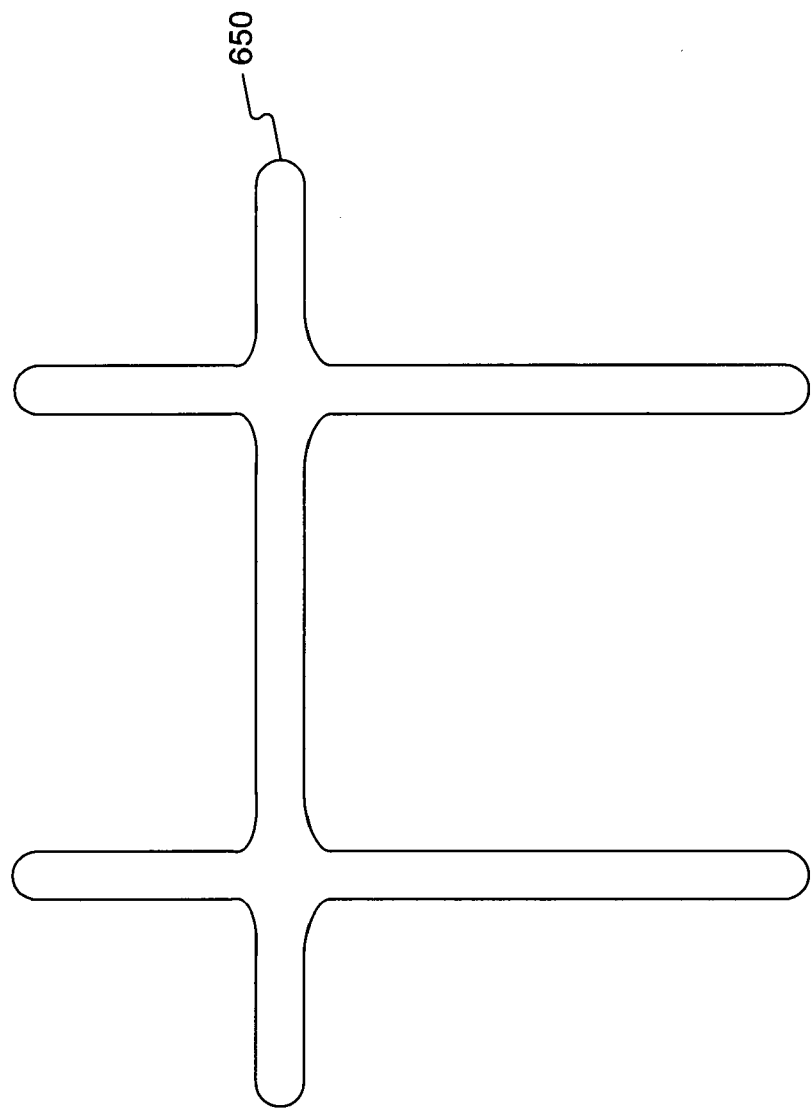
FIG. 6 illustrates mandrel preparation consistent with an embodiment of the present invention, as shown in FIG. 5.

FIG. 6 illustrates mandrel preparation consistent with an embodiment of the present invention, as shown in FIG. 5. FIG. 6 shows an internal frame mandrel 650, such as, for example, a reusable elastomeric mandrel currently available through International Design Technologies, Inc (IDT). This implementation is merely exemplary, and other implementations may also be used.

Mandrel 650 may comprise premolded silicone or other appropriate forms or substances. Some silicone materials that have been found acceptable include those available from D Aircraft Products. In addition, there are many other suppliers of high temperature (up to 400° F.), unfilled, and uncured silicone sheet materials that may be used, depending upon the cure temperature of the desired part. Some of the other suppliers include Arlon, Mosite, and Kirkhill. These implementations are merely exemplary, and other implementations may also be used.

Figure 7:
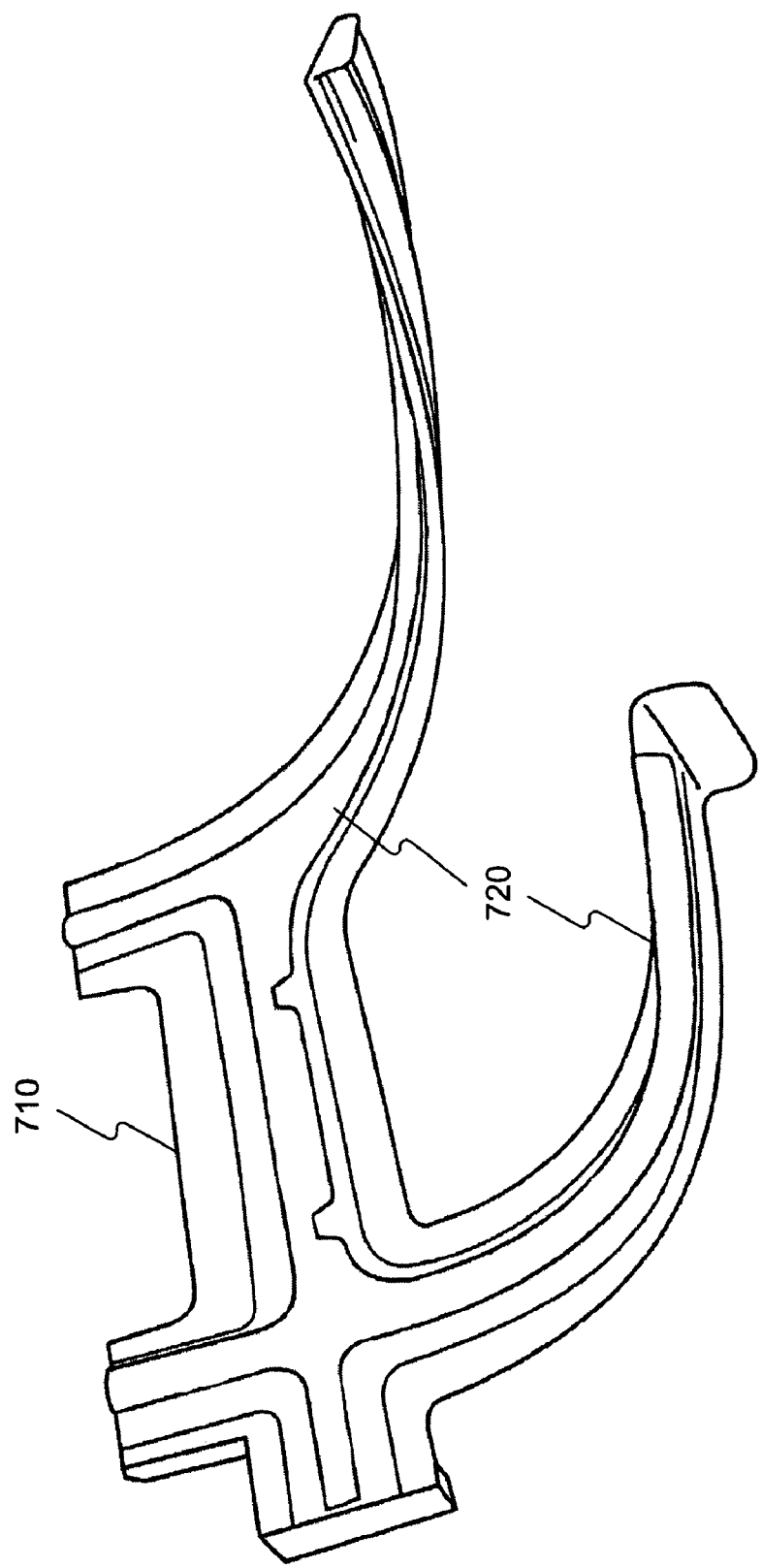
FIG. 7 illustrates mandrel formation consistent with an embodiment of the present invention, as shown in FIG. 6.

FIG. 7 illustrates mandrel formation consistent with an embodiment of the present invention, as shown in FIG. 6. As shown in FIG. 7, mandrel 720 is placed in a form tool 710 (only half of which is shown in FIG. 7) to form the desired shape of the internal frame mandrel in a well-known manner. In one implementation, mandrel 720 is filled with air to force mandrel 720 to conform to the shape of form tool 710. In another implementation, a vacuum is used to hold the mandrel to the shape of the form tool. This implementation is merely exemplary, and other implementations may also be used.

Figure 8:
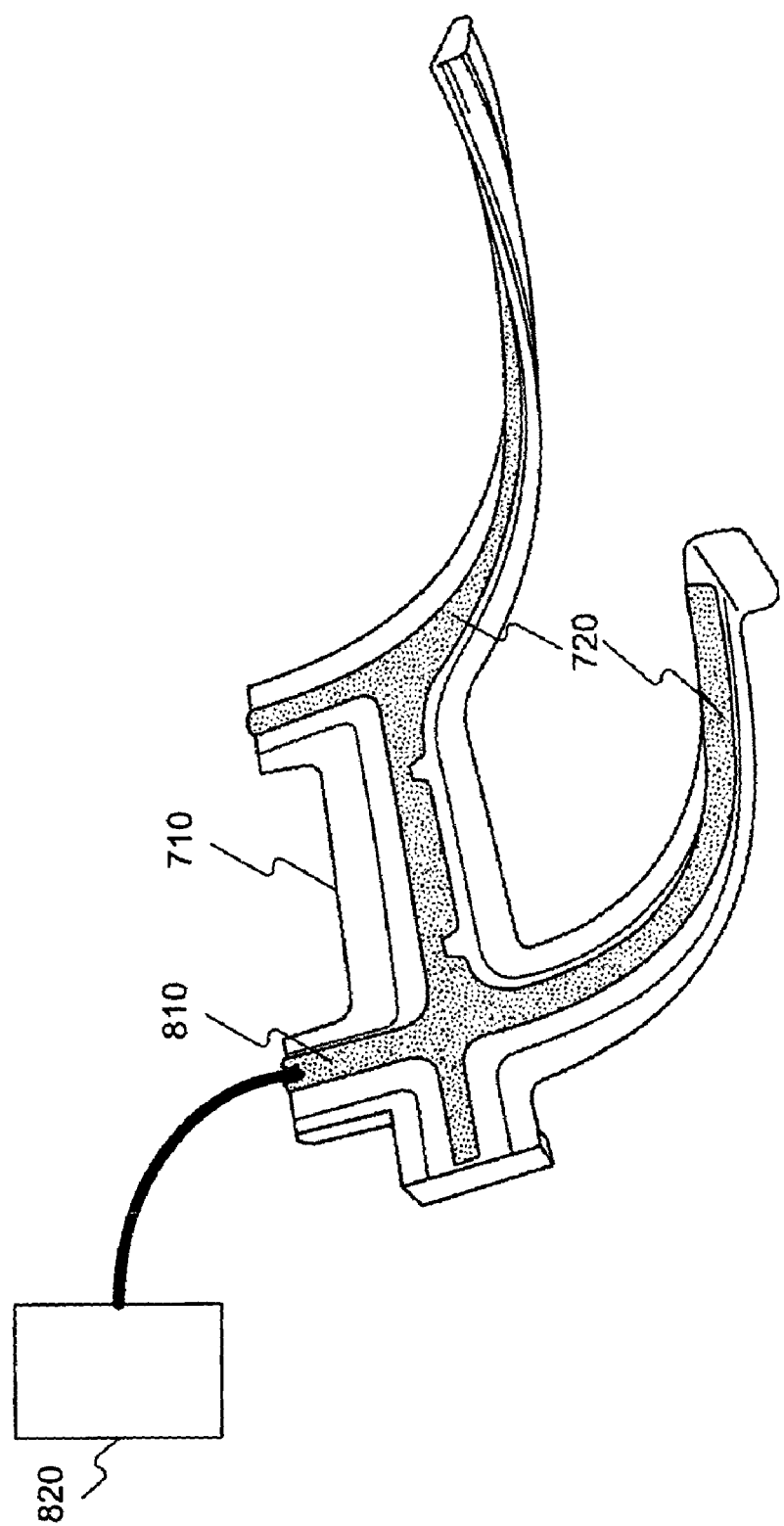
FIG. 8 illustrates introducing media into a frame mandrel consistent with an embodiment of the present invention, as shown in FIG. 7.

FIG. 8 illustrates introducing media into a frame mandrel consistent with an embodiment of the present invention, as shown in FIG. 7. As shown in FIG. 8, after forming mandrel 720 to the shape of form tool 710 (as described in FIG. 7), media 810 may be placed inside mandrel 720. Media 810 may comprise any number of elements. Smaller and irregular media may be more difficult to extract. Larger media, however, may produce an irregular surface on the mandrel. Therefore, in one implementation, media 810 is selected to be a material that will not produce an irregular surface and is not overly difficult to extract. In another implementation, media 810 comprises ceramic spheres available under the product name Macrolite. These implementations are merely exemplary, and other materials may also be used.

In one implementation, mandrel 720 is filled with media 810 while pressurized. As shown in FIG. 8, in this implementation, a media introduction device 820 introduces media 810 into mandrel 720. During the introduction of media 810, media 810 may be compacted to settle the media and provide for a more rigid mandrel. In one implementation, compaction of media 810 is achieved by vibrating mandrel 720. These implementations are merely exemplary, and other implementations may also be used.

Figure 9B:
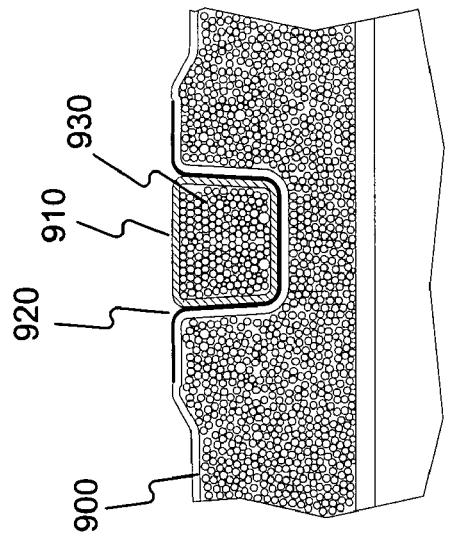
FIG. 9B illustrates a frame mandrel placed on a fuselage consistent with an embodiment of the present invention, as shown in FIG. 9A.
Figure 9A:
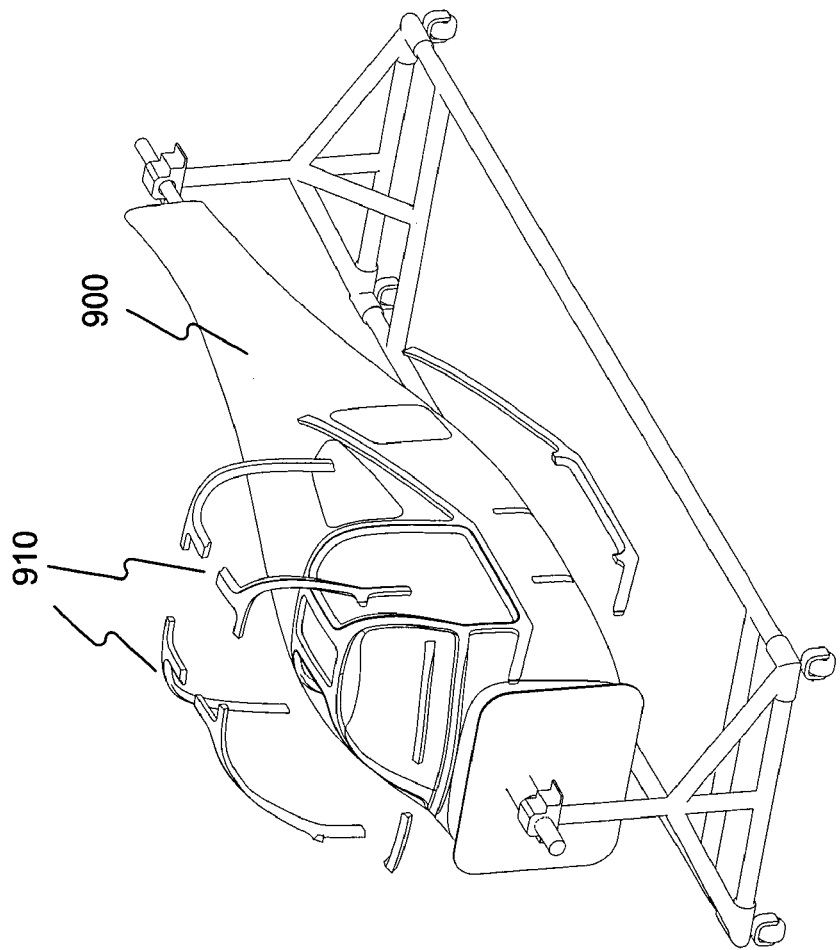
FIG. 9A illustrates frame mandrel placement on a fuselage consistent with an embodiment of the present invention, as shown in FIG. 8.

FIG. 9A illustrates frame mandrel placement on a fuselage consistent with an embodiment of the present invention, as shown in FIG. 8. As shown in FIG. 9, frame mandrel 910 is placed around fuselage mandrel 900 to form a fuselage. Frame mandrel 910 forms the internal frame structure of the fuselage. In one implementation, fuselage mandrel 900 may have indentations in which frame mandrel 910 is placed. In another implementation, composites will be laid up in this indentation before placement of frame mandrel 910 on fuselage mandrel 910. This implementation is merely exemplary, and other implementations may also be used.

FIG. 9B illustrates a frame mandrel placed on a fuselage consistent with an embodiment of the present invention, as shown in FIG. 9A. As shown in FIG. 9B, in one embodiment, frame mandrel 910 is placed in an indentation in fuselage mandrel 900. As further shown in FIG. 9B, frame mandrel 910 has been filled with media 930. In this embodiment, composites 920 were laid up in the indentation before placement of frame mandrel 910. This implementation is merely exemplary, and other implementations may also be used.

Figure 10B:
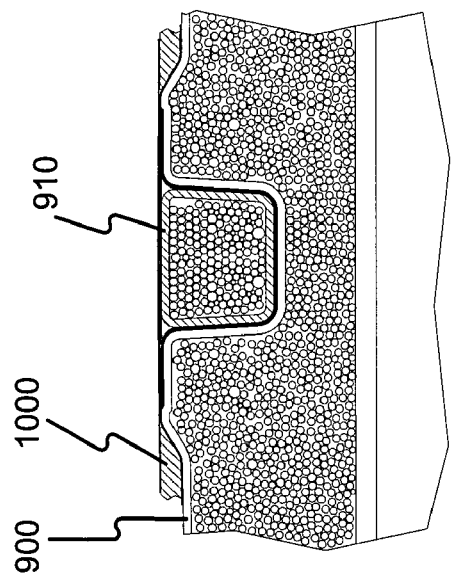
FIG. 10B illustrates a fuselage formed on a mandrel consistent with an embodiment of the invention, as shown in FIG. 10A.
Figure 10A:
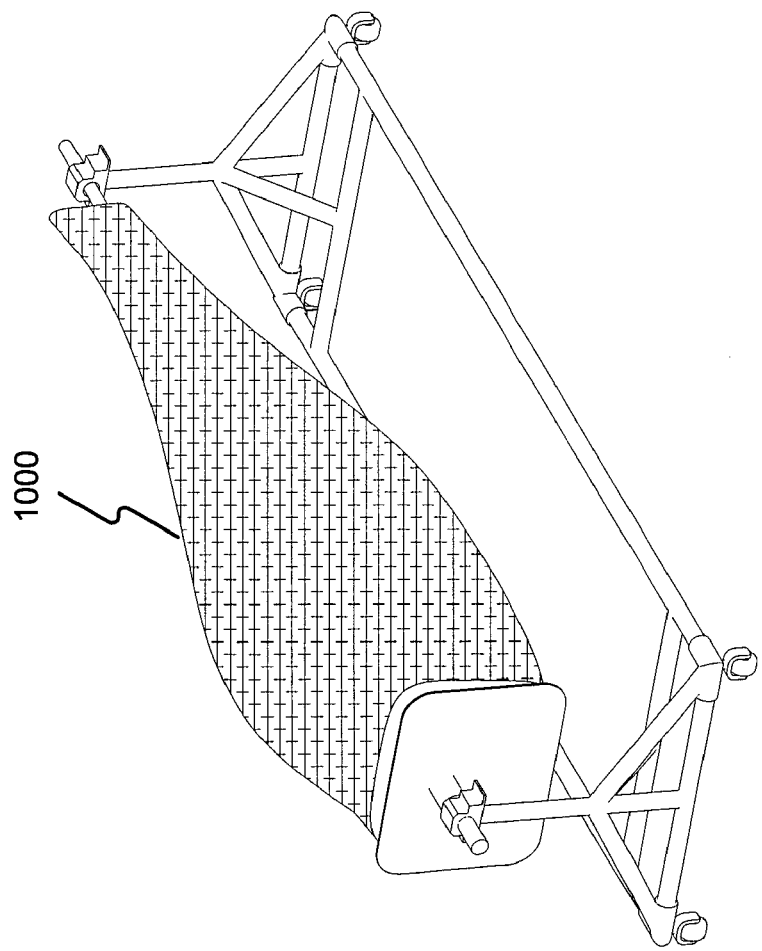
FIG. 10A is a perspective view of a fuselage formed on a mandrel consistent with an embodiment of the invention, as shown in FIG. 9A.

FIG. 10A is a perspective view of a fuselage formed on a mandrel consistent with an embodiment of the invention, as shown in FIG. 9A. As shown in FIG. 9, fuselage 1000 has been formed around frame mandrel 910. Any number of methods may be used to form the fuselage. In one implementation, filament is wound around fuselage mandrel 910 to form fuselage 1000. Fuselage 1000 may then be cured to produce a structurally sound and lightweight fuselage. This implementation is merely exemplary, and other implementations may also be used.

FIG. 10B illustrates a fuselage formed on a mandrel consistent with an embodiment of the invention, as shown in FIG. 10A. As shown in FIG. 10B, fuselage 1000 has been formed around frame mandrel 910 and fuselage mandrel 900. This implementation is merely exemplary, and other implementations may also be used.

Figure 11:
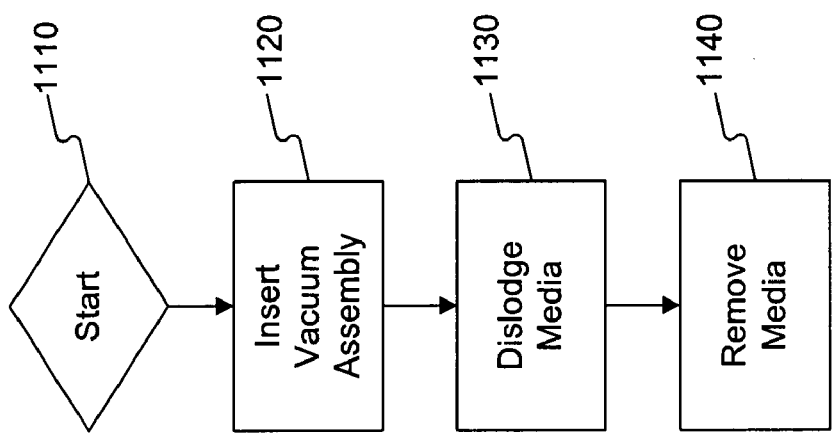
FIG. 11 is a flow diagram illustrating a media removal process consistent with the present invention.

FIG. 11 is a flow diagram illustrating a media removal process consistent with the present invention. As shown in FIG. 11, media removal process 1100 comprises start 1110, insert vacuum assembly 1120, dislodge media 1130, and remove media 1140.

In this implementation, process 1100 begins with start 1110. After start 1110 is insert vacuum assembly 1120. In this implementation, insert vacuum assembly 1120 comprises the insertion of a vacuum assembly into the mandrel. The vacuum assembly may include a hose connected to a vacuum source and a device to dislodge the media in the mandrel. Insert vacuum assembly 1120 is further described in relation to FIGS. 12-15.

In this implementation, insert vacuum assembly 1120 is followed by dislodge media 1130. Dislodge media 1130 may include the use of a mechanical device or an air nozzle to dislodge clumped media in the mandrel. Dislodge media 1130 is further described in relation to FIG. 15.

In this implementation, dislodge media 1130 is followed by remove media 1140. Remove media 1140 comprises the use of the vacuum assembly to remove the dislodged media from the mandrel. Remove media 1140 is further described in FIG. 15.

The stages in FIG. 11 are merely exemplary, and other stages and other implementations may also be used.

Figure 12:
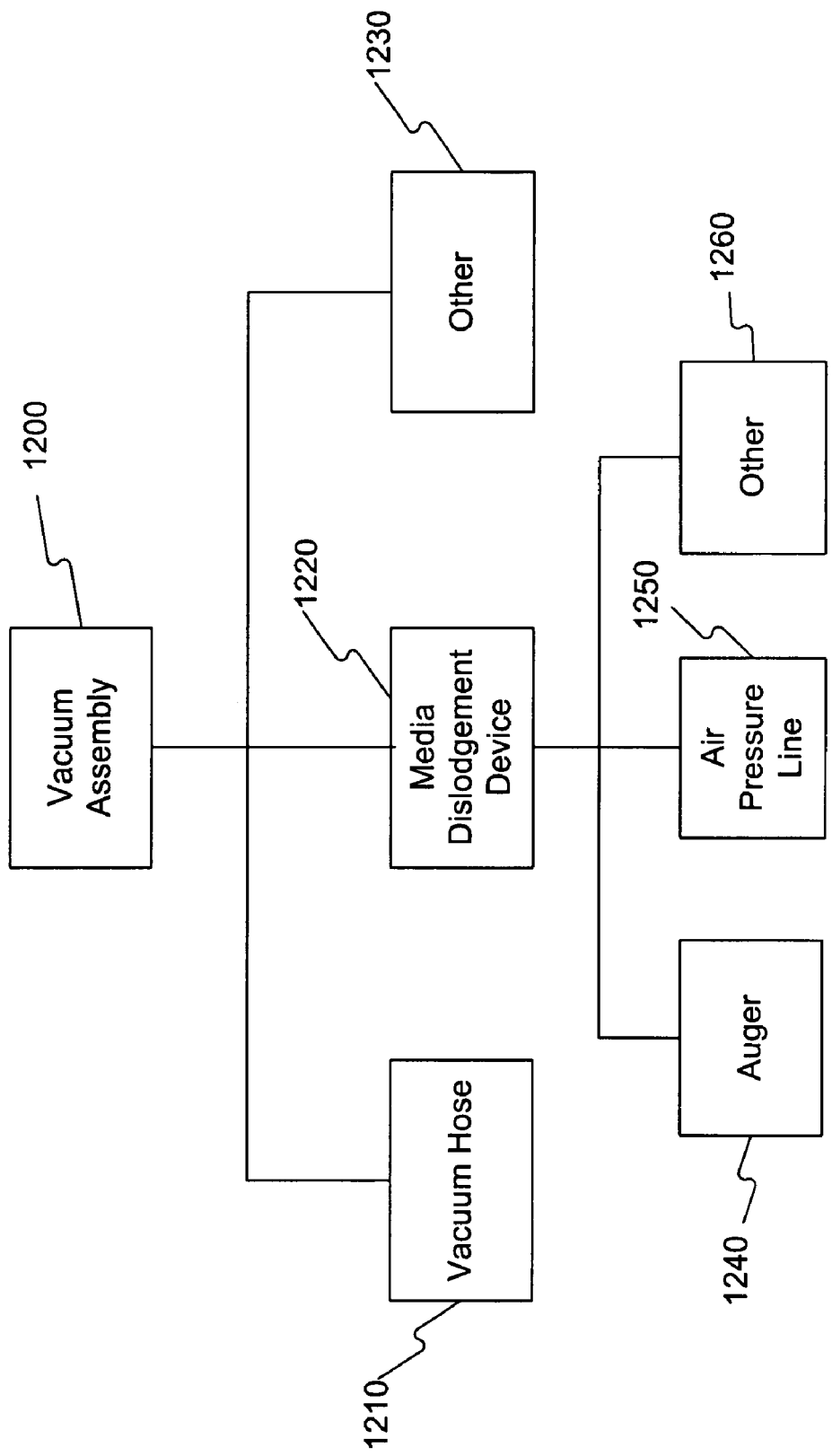
FIG. 12 is a block diagram illustrating components of a vacuum assembly consistent with an embodiment of the invention.

FIG. 12 is a block diagram illustrating components of a vacuum assembly consistent with an embodiment of the invention. As shown in FIG. 12, vacuum assembly 1200 may comprise a vacuum hose 1210, a media dislodgement device 1220, and other 1230.

In this implementiation, vacuum hose 1210 is a hose attached to a vacuum source (not shown). The hose is used to remove the media form a mandrel, as described below.

Figure 17A:
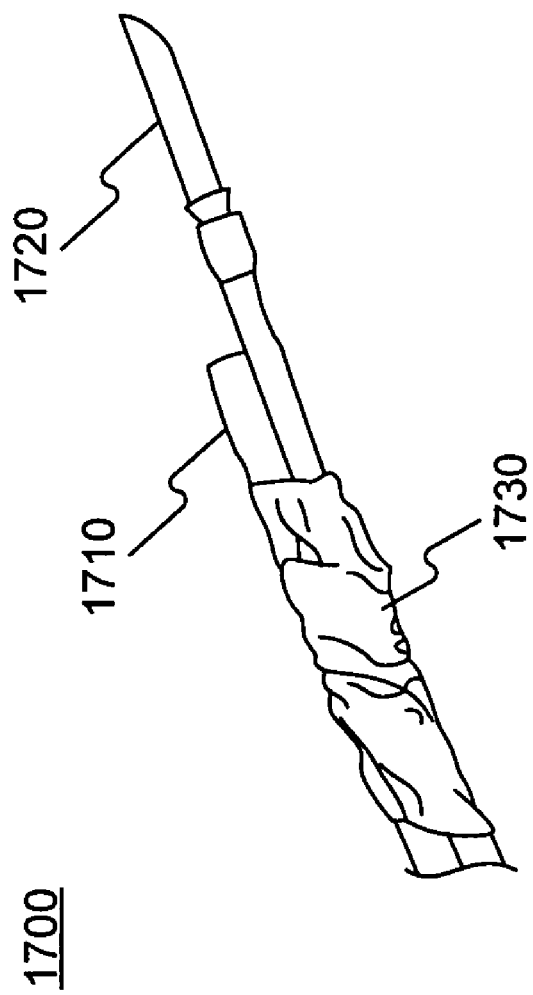
FIG. 17A illustrates a vacuum assembly consistent with another embodiment of the invention.
Figure 17B:
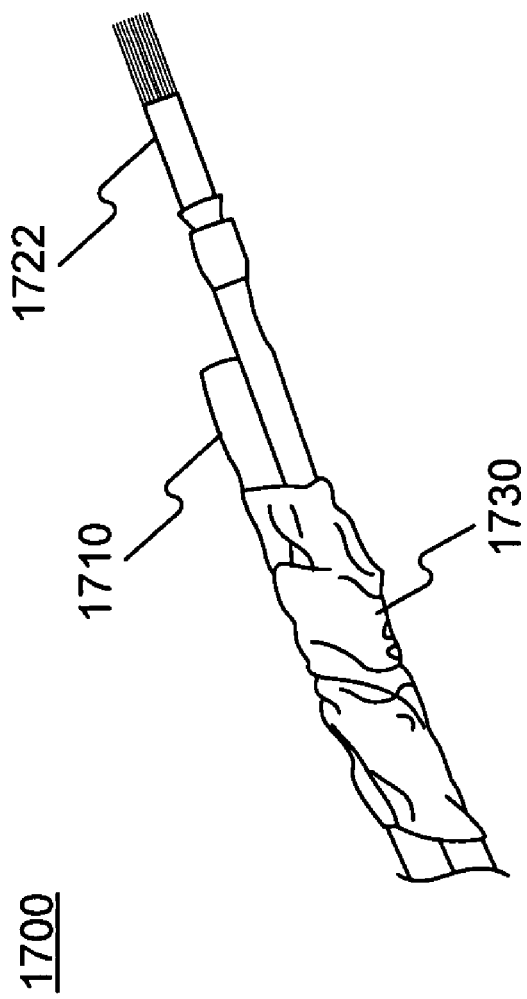
FIG. 17B illustrates a vacuum assembly consistent with another embodiment of the invention.
Figure 17C:
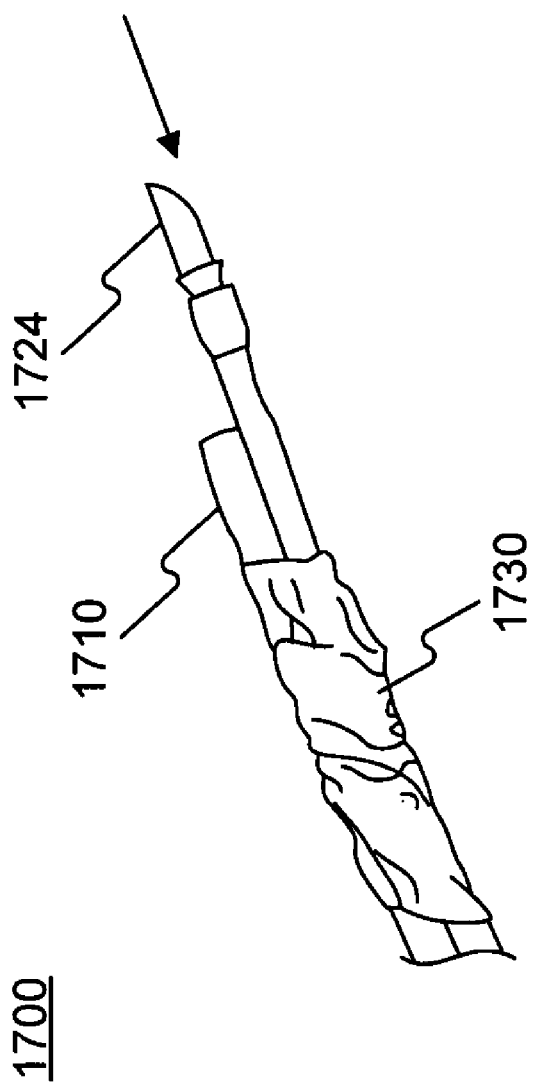
FIG. 17C illustrates a vacuum assembly consistent with another embodiment of the invention.

In this implementation, media dislodgement device 1220 dislodges the media in the mandrel, allowing it to be more easily removed by vacuum hose 1210. As shown in FIG. 12, media dislodgement device 1220 may be an auger 1240, an air pressure line 1250, or other 1260. Auger 1240 includes any boring device to dislodge the media. Auger 1240 is further described in relation to FIG. 13. Air pressure line 1250 includes a hose connected to an air source to produce a high velocity air flow to dislodge media in the mandrel. Air pressure line 1250 may comprise a nozzle to control media dislodgement. Air pressure line 1250 is further described in relation to FIG. 14. Other 1260 includes any other apparatus for dislodging the media in the mandrel. For example, a combination of an auger and air pressure line may be used. In addition, a non-rotating scraping device, brush device, or reciprocating device could also be used. One embodiment of a non-rotating scraping device is shown in FIG. 17A. One embodiment of a brush device is shown in FIG. 17B. One embodiment of a reciprocating device is shown in FIG. 17C. These implementations are merely exemplary, and other implementations may also be used.

In this implementation, other 1230 includes any other device to assist in the removal or dislodgement of media in the mandrel. The implementation in FIG. 12 is merely exemplary, and other implementations may also be used.

Figure 13:
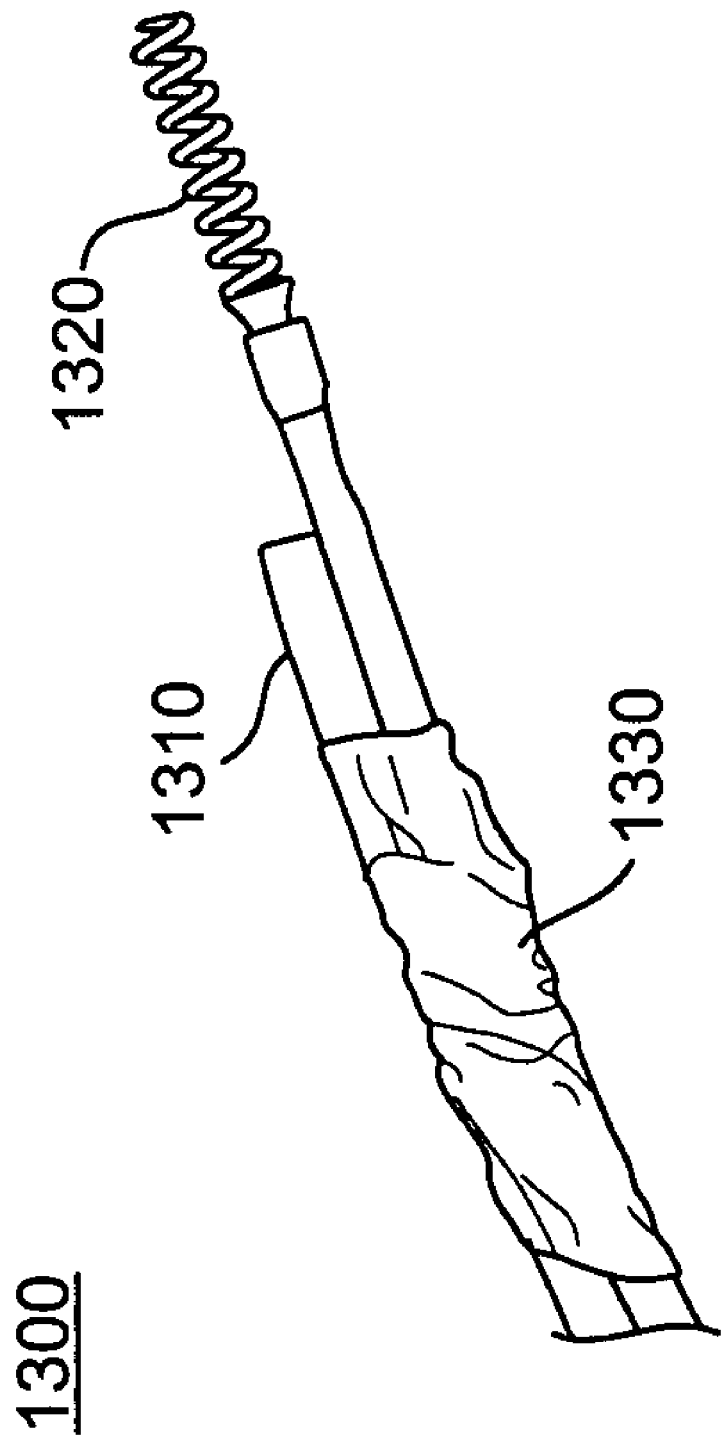
FIG. 13 illustrates a vacuum assembly consistent with one embodiment of the present invention, as shown in FIG. 12.

FIG. 13 illustrates a vacuum assembly consistent with one embodiment of the present invention, as shown in FIG. 12. As shown in FIG. 13, vacuum assembly 1300 comprises a vacuum hose 1310, an auger 1320, and attachment device 1330 to attach auger 1320 to the outside of vacuum hose 1310. This implementation is merely exemplary, and other implementations may also be used.

Figure 14:
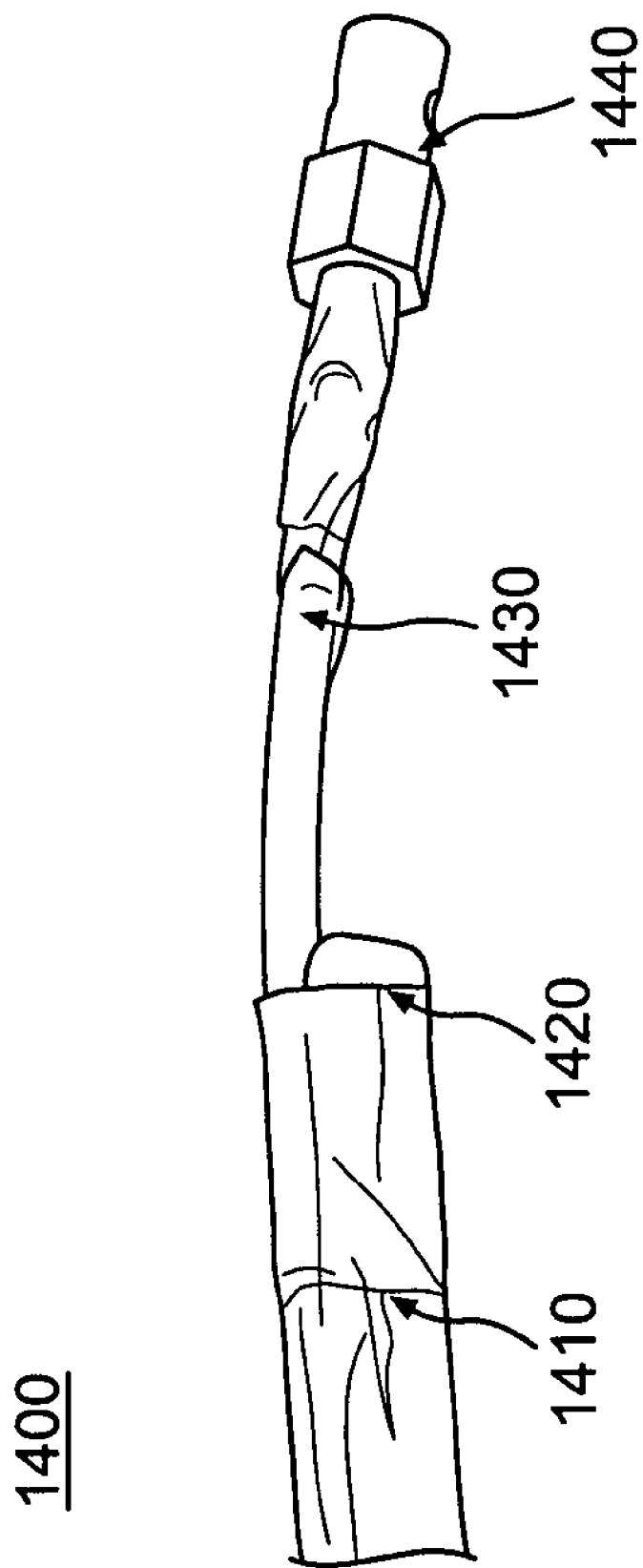
FIG. 14 illustrates a vacuum assembly consistent with another embodiment of the present invention, as shown in FIG. 12.
Figure 15:
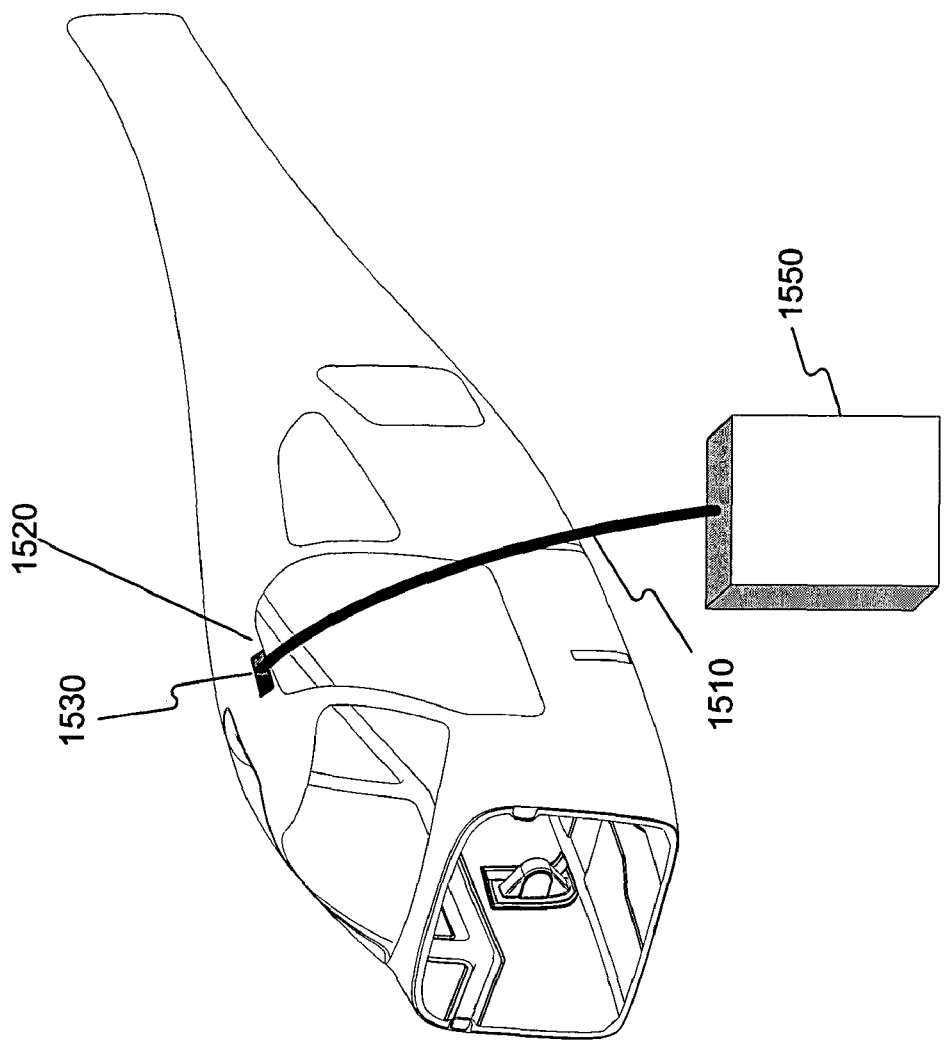
FIG. 15 illustrates inserting a vacuum assembly into a frame mandrel consistent with an embodiment of the present invention as shown in FIGS. 13-14.

Vacuum hose 1310 extracts media from a mandrel (not shown in FIG. 13, but shown in FIG. 15). Vacuum hose 1310 is attached to a vacuum source (not shown in FIG. 13, but shown in FIG. 15). Auger 1320 dislodges compacted media inside the mandrel. In one embodiment, auger 1320 may have a corkscrew shape, as shown in FIG. 14. In another embodiment, auger 1320 may rotate to further dislodge the media. In still another embodiment, auger 1320 may be made from or coated with a softer (non-metallic) material such as nylon plastic to minimize damage to mandrels. These implementations are merely exemplary, and other implementations may also be used.

Attachment device 1330 may be used to attach auger 1320 to vacuum hose 1310. For example, attachment device 1330 may include tape, bonding or fasteners. However, any method of attaching auger 1320 to vacuum hose 1310 may be used. In another embodiment, auger 1320 is coaxially positioned in vacuum hose 1310. In this implementation, auger 1320 may be capable of axial translation. These implementations are merely exemplary, and other implementations may also be used.

In one implementation, when vacuum assembly 1300 is inserted into the mandrel, auger 1320 dislodges the compacted media located in the mandrel. This dislodged media will be extracted by vacuum hose 1310. Further, the rotation of auger 1320 may also whip the media into suspension for the vacuum hose 1310 to extract.

FIG. 14 illustrates a vacuum assembly consistent with another embodiment of the present invention, as shown in FIG. 12. As shown in FIG. 14, vacuum assembly 1400 comprises a vacuum hose 1420, an air pressure line 1430, a nozzle 1440, and an attachment device 1410 to attach air pressure line 1430 to vacuum hose 1420. This implementation is merely exemplary, and other implementations may also be used.

Vacuum hose 1420 extracts media from a mandrel (not shown in FIG. 14, but shown in FIG. 15). Vacuum hose 1420 is attached to a vacuum source (not shown in FIG. 14, but shown in FIG. 15). Air pressure line 1430 is attached to nozzle 1440 and an air source (not shown). Air source will provide air into air pressure line 1430. The air will exit the air pressure line at an accelerated rate from nozzle 1440. Various nozzle shapes are possible. In one implementation, the nozzle will have a conical shape. The high velocity air exiting nozzle 1440 will dislodge the media inside the mandrel. The media will then be extracted by vacuum hose 1420. These implementations are merely exemplary, and other implementations may also be used.

Attachment device 1410 may be used to attach air pressure line 1430 to vacuum hose 1420. For example, attachment device 1410 may include tape, bonding or fasteners. However, any method of attaching air pressure line 1430 to vacuum hose 1420 may be used. In another embodiment, air pressure line 1430 is coaxially inserted through vacuum hose 1420. These implementations are merely exemplary, and other implementations may also be used.

FIG. 15 illustrates inserting a vacuum assembly into a frame mandrel consistent with an embodiment of the present invention, as shown in FIGS. 13-14. As shown in FIG. 15, following formation of the part (as described in FIG. 10), frame 1520 is formed in the fuselage. A portion of frame 1520 is cutaway to reveal frame mandrel 1530. As shown in FIG. 15, a vacuum assembly 1510 is connected to a vacuum source 1550. Vacuum assembly 1510 is of the type described above in FIGS. 12-14. Vacuum assembly 1510 is the inserted into mandrel 1530 to dislodge and remove the media, as described above. In one implementation, vacuum assembly 1510 is manually inserted into mandrel 1530. In another implementation, vacuum assembly 510 is mechanically inserted into mandrel 1530 using wheels or treads. These implementations are merely exemplary, and other implementations may also be used.

Figure 16:
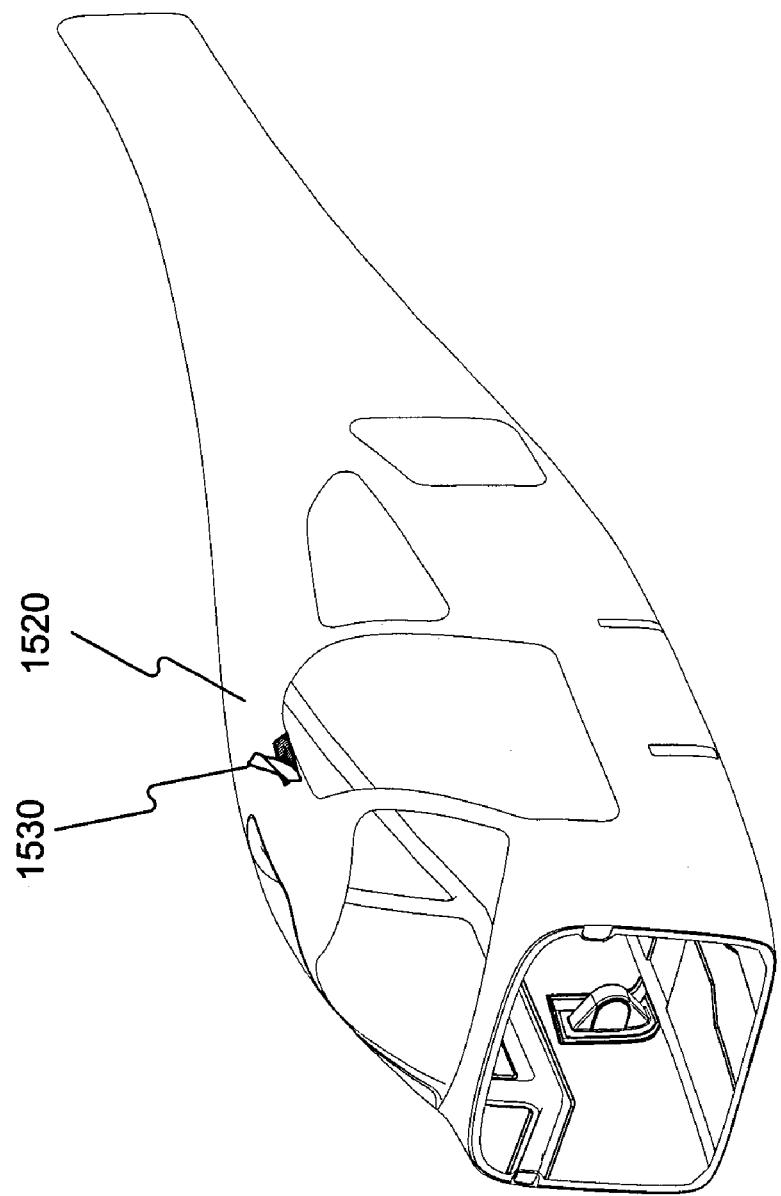
FIG. 16 illustrates removing a frame mandrel from a fuselage consistent with an embodiment of the present invention as shown in FIG. 15.

FIG. 16 illustrates removing a frame mandrel from a fuselage consistent with an embodiment of the present invention as shown in FIGS. 15. As shown in FIG. 16, following removal of the media from mandrel 1530, mandrel 1530 is removed from frame 1520. Following removal of mandrel 1530, mandrel 1530 may be reused in the formation of another fuselage. These implementations are merely exemplary, and other implementations may also be used.

FIG. 17A illustrates a vacuum assembly consistent with another embodiment of the invention. As shown in FIG. 17A, vacuum assembly 1700 may comprise a vacuum hose 1710, a non-rotating scraping device 1720, and attachment device 1730 to attach non-rotating scraping device 1720 to the outside of the vacuum hose 1710. This implementation is merely exemplary, and other implementations may also be used.

FIG. 17B illustrates a vacuum assembly consistent with another embodiment of the invention. As shown in FIG. 17B, vacuum assembly 1700 may comprise a vacuum hose 1710, a brush device 1722, and attachment device 1730 to attach brush device 1722 to the outside of the vacuum hose 1710. This implementation is merely exemplary, and other implementations may also be used.

FIG. 17C illustrates a vacuum assembly consistent with another embodiment of the invention. As shown in FIG. 17C, vacuum assembly 1700 may comprise a vacuum hose 1710, a reciprocating device 1724, and attachment device 1730 to attach reciprocating device 1724 to the outside of the vacuum hose 1710. This implementation is merely exemplary, and other implementations may also be used.

CONCLUSION

As described above, therefore, other embodiments consistent with the invention will be apparent to those skilled in the art from consideration of the specification and practice of the invention disclosed herein. It is intended that the specification and examples be considered as exemplary only, with a true scope and spirit of the invention being indicated by the following claims and their equivalents. In this context, equivalents mean each and every implementation for carrying out the functions recited in the claims, even if not explicitly described therein.

What is claimed is:

1. A method of removing compacted solid media from a mandrel formed of a deformable material, the media being added to provide rigidity during processing, comprising:
    inserting a vacuum assembly including a vacuum hose configured to remove compacted solid media and a media dislodgement device configured to dislodge compacted solid media into the mandrel;
    dislodging the compacted solid media using the media dislodgement device; and
    extracting the solid media using the vacuum hose.

2. The method of claim 1,
    wherein dislodging the compacted solid media using the media dislodgement device includes using an auger to dislodge the compacted solid media.

3. The method of claim 1, wherein the mandrel is an internal mandrel for a fuselage.

4. The method of claim 1, wherein dislodging the compacted solid media using the media dislodgement device includes using an air pressure line to dislodge the compacted solid media.

5. The method of claim 1,
    wherein dislodging the compacted solid media using the media dislodgement device includes using a non-rotating scraping device to dislodge the compacted solid media.

6. The method of claim 1,
    wherein dislodging the compacted solid media using the media dislodgement device includes using a brush device to dislodge the compacted solid media.

7. The method of claim 1,
    wherein dislodging the compacted solid media using the media dislodgement device includes using a reciprocating device to dislodge the compacted solid media.

8. The method of claim 2, wherein using an auger to dislodge the compacted solid media includes rotating the auger.

\* \* \* \* \*